(No Model.) 2 Sheets—Sheet 2.
N. C. BASSETT.
ARMATURE FOR MOTORS AND GENERATORS.
No. 483,708. Patented Oct. 4, 1892.
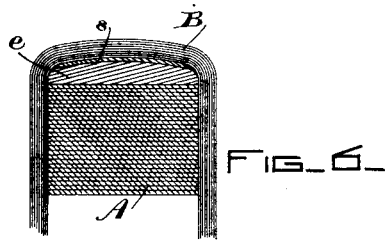
FIG_6_
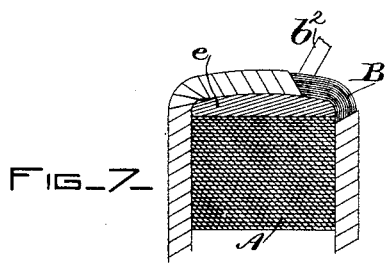
FIG_7_
WITNESSES: INVENTOR:

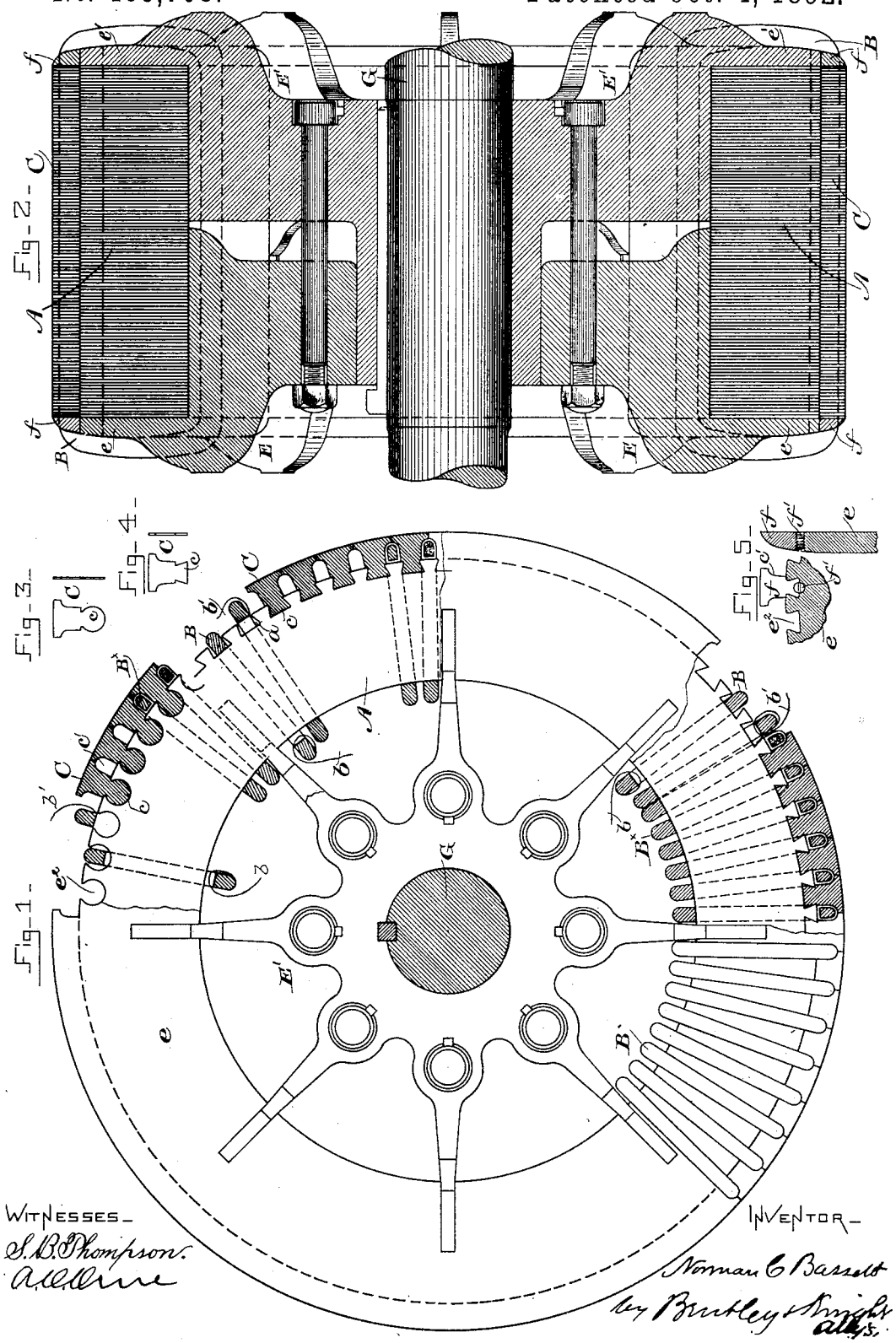

UNITED STATES PATENT OFFICE.

NORMAN C. BASSETT, OF LYNN, MASSACHUSETTS, ASSIGNOR TO THE THOMSON-HOUSTON ELECTRIC COMPANY, OF CONNECTICUT.

ARMATURE FOR MOTORS AND GENERATORS.

SPECIFICATION forming part of Letters Patent No. 483,708, dated October 4, 1892.

Application filed February 27, 1891. Serial No. 383,106. (No model.)

*To all whom it may concern:*

Be it known that I, NORMAN C. BASSETT, a citizen of the United States, residing at Lynn, in the county of Essex and State of Massachusetts, have invented a certain new and useful Improvement in Armatures for Motors and Generators, of which the following is a specification.

My invention relates to improvements in those armatures known as "iron-clad," in which the iron of the core is made to project between and over the coils of the same, so as to form an iron periphery, which at the same time lowers the magnetic resistance of the machine and protects the armature-coil from damage. These advantages are well known; and my invention relates to means whereby an armature having such advantage may be wound as easily and, in fact, in the same manner as the Gramme-ring type of armature. Another object of my invention is to enable the insulation of the coils by winding tape around them after they are wound on the core.

An armature embodying my improvement is shown in partly-sectioned side elevation in Figure 1 and in axial section in Fig. 2. Figs. 3, 4, 5, 6, and 7 show details.

In forming my armature I construct an interior laminated core-body A, similar to the usual laminated Gramme-ring core; but in the periphery thereof is formed a series of grooves $a$, extending longitudinally of the armature and of such a size as to easily receive the individual armature-coils B. These grooves are undercut or dovetailed in order to interlock with the peripheral sections hereinafter described. The laminated core-body A is clamped between end plates $e\ e'$, supported on spiders E E', secured to shaft G, said end plates or armature-heads having grooves or notches $e^2$, which correspond in shape to and are in line with the grooves $a$. The armature-coils are wound on this interior core, and, being then slipped into the groove, they may be wound with tape on the inner side or portion, as shown at $b$, and on then lifting them slightly they may be taped on the outer portion, as at $b'$. In order to enable the ends of the armature-coil to be similarly taped, a separator or strip of pasteboard S should be placed on the sides of the armature-heads during winding, as shown in Fig. 6, so that when the coil is completed and this pasteboard strip is withdrawn sufficient space is left for the tape $b^2$ to pass between the coil and the armature-head in the manner indicated in Fig. 7. By this construction it will be seen that after the coil has been wound in place after the usual manner it may be completely taped not only on the interior and exterior of the core, but around the ends also. The coil is then pushed up into place, as shown at $B^\times$, so as to occupy the space between two grooves. It will then fit tightly around the armature-core. After all the coils are wound in this manner and taped the periphery of the core is built up in the following manner: A series of plugs or sections C, having portions $c$, corresponding in shape to the grooves in the periphery of the core, so as to interlock therewith, are threaded or pushed into said grooves one by one from both sides of the armature-core toward the center, and this process is continued until the grooves are filled from end to end, and a punch or hammer is then used for tightening. After as many are gotten in as the length of the core will allow thick dovetailed pieces $f$, as shown in Fig. 5, are driven into place in the grooves or notches in the armature-heads and held there by screws $f'$, tapped half and half into the section-plates and the armature-heads. These sections are channeled at the sides to form holes $c'$ for receiving the coils, and extend out and over said coils, so as to meet at the circumference of the armature and form a closed iron periphery. After all the grooves have been thus filled the armature is put into the lathe and the circumference is turned to the desired size.

When necessary to repair this armature by winding in a new coil, the screws can be removed and a punch used to drive a section of plates out of the groove, when the new coil may be wound in, taped, and the periphery completed by new plates.

The grooves and section-plates may obviously have various forms, so as to make an interlocking joint. The form shown in Fig. 3 and the upper part of Fig. 1—namely, a circle intersecting the circumference of the interior core-body—is preferred; but the ordinary dovetail shown in Figs. 4 and 5 and also in part of Fig. 1 is also efficient for this purpose.

While I have shown my invention applied to the Gramme-ring type of armature, I do not consider it restricted thereto, as it may be advantageously applied to other forms of armature.

Certain details of the armature-support—namely, a spider with pressing faces to facilitate driving into place and with overlapping lugs to retain the laminations—are incidentally shown herein, but are claimed in my patent, No. 456,925, granted July 28, 1891.

What I claim as new, and desire to secure by Letters Patent, is—

1. An iron-clad armature having an interior core or body with peripheral grooves, coils surrounding the core between the grooves, and sections attached to said core-body by engagement in said grooves and surrounding the coils.

2. An armature having an interior core and surface sections attached to said body, extending out over the coils, and meeting at the surface, so as to completely inclose the coils and form a closed surface.

3. An armature having its periphery built up of sections attached to and interlocked with an interior core-body, the said sections being channeled to receive the armature-coils.

4. The method of forming and winding an armature, which consists in forming a groove in the periphery of the core, winding the coil around the core, placing the coil to register with said groove and winding the coil with tape, placing the coil over the ungrooved portion, and filling up the groove with magnetic material.

5. The core-body having peripheral grooves forming a space for receiving the amature coils or tape while winding the armature with tape, in combination with attachable sections adapted to fill said grooves and be held in them and to surround and hold in place the armature-coils when the latter are shifted to their final positions.

6. The combination, with a laminated core-body and the coils wound thereon, of the laminar sections attached to and interlocking with the core body and extending between and over the armature-coils, so as to form the periphery or surface of the armature.

7. An armature-core comprising an interior laminated core-body, laminar peripheral sections interlocked therewith, and end plates or heads and end pieces also interlocking, between which the body and section laminations are respectively clamped.

8. The method of winding and insulating an armature, which consists in placing separators against the core ends, winding the coils on the core and over said separators, removing said separators, and then winding the coil with tape, passing the tape through the space left by the removal of such separators.

9. An armature for dynamo-electric machines, having coils wound thereon and sections attached to the body of the core between the coils and meeting over the coils to form the periphery or surface of the armature.

10. An armature for dynamo-electric machines, having coils wound thereon and sections interlocking with the body of the core and extending between the coils to form the periphery or surface of the armature.

11. An armature having a portion of its surface built up of sections attached to and interlocked with an interior core-body, the sections being channeled to receive the armature-coils.

12. The method of forming and winding an armature, which consists in forming a groove in the surface of the core, winding the coil around the core, placing the coil to register with said groove and winding the coil with tape, placing the coil over the ungrooved portion, and filling up the groove with magnetic material.

NORMAN C. BASSETT.

Witnesses:
JOHN W. GIBBONEY,
BENJAMIN B. HULL.